(12) United States Patent
Iijima

(10) Patent No.: US 7,466,349 B2
(45) Date of Patent: Dec. 16, 2008

(54) IMAGE SENSING DEVICE, IMAGE EDIT METHOD, AND STORAGE MEDIUM FOR RECORDING IMAGE EDIT METHOD

(75) Inventor: Jun Iijima, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 413 days.

(21) Appl. No.: 10/511,963

(22) PCT Filed: Nov. 26, 2003

(86) PCT No.: PCT/JP03/15111

§ 371 (c)(1),
(2), (4) Date: Oct. 19, 2004

(87) PCT Pub. No.: WO2004/061847

PCT Pub. Date: Jul. 22, 2004

(65) Prior Publication Data

US 2005/0157183 A1    Jul. 21, 2005

(30) Foreign Application Priority Data

Dec. 26, 2002 (JP) ............................. 2002-378583
Oct. 14, 2003 (JP) ............................. 2003-353695

(51) Int. Cl.
H04N 5/76 (2006.01)
(52) U.S. Cl. .............................. 348/231.99; 348/333.02
(58) Field of Classification Search . 348/231.99–231.3, 348/333.02–333.04; 386/107, 117
See application file for complete search history.

(56) References Cited

U.S. PATENT DOCUMENTS 6,052,508 A    4/2000    Mincy et al.
2001/0026644 A1    10/2001    Endo et al.

FOREIGN PATENT DOCUMENTS

| JP | 10-191248 A | 7/1998 |
| JP | 11103382 | 4/1999 |
| JP | 11-275512 A | 10/1999 |
| JP | 11275512 | 10/1999 |
| JP | 11-339448 A | 12/1999 |
| JP | 2001-57662 A | 2/2001 |
| JP | 2002-208262 A | 7/2002 |

*Primary Examiner*—Tuan V Ho
(74) *Attorney, Agent, or Firm*—Frishauf, Holtz, Goodman & Chick, P.C.

(57) ABSTRACT

An image sensing device that can photograph and play back a moving image simplifies and executes an edit operation for forming one moving image by inserting another image in the middle of a given moving image. A device includes a flash memory (38) which records moving image data, a key input unit (36) which designates an arbitrary time position in the moving image data recorded in the flash memory (38), and a control unit (32) which starts photographing of an image on the basis of designation of the time position, inserts image data obtained by photographing in the moving image data on the basis of the designated time position, and plays back the obtained moving image data.

11 Claims, 10 Drawing Sheets

MOVING IMAGE A

MOVING IMAGE A    IM (A1)            (A2)

MOVING IMAGE B

MOVING IMAGE A1+B+A2

(A1)        (B)        (A2)

MOVING IMAGE A'

FIG.6A MOVING IMAGE A
FIG.6B MOVING IMAGE A
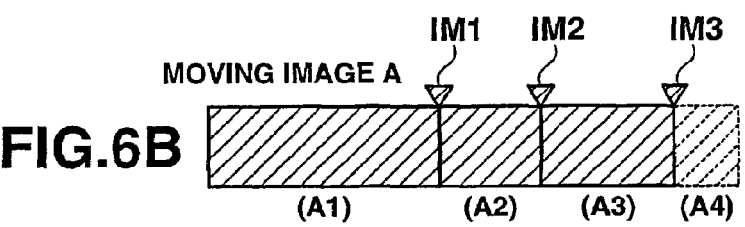
(A1) (A2) (A3) (A4)
FIG.6C MOVING IMAGE B
FIG.6D MOVING IMAGE C
FIG.6E MOVING IMAGE D
FIG.6F MOVING IMAGE A1+B+A2+C+A3+D+A4
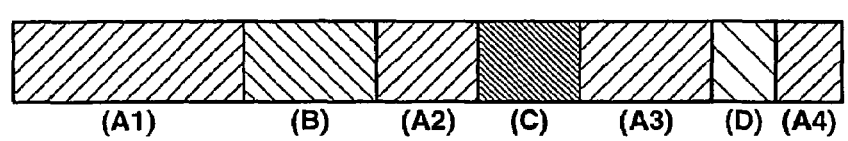
(A1) (B) (A2) (C) (A3) (D) (A4)
FIG.6G MOVING IMAGE A'
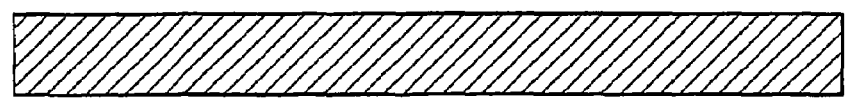

FIG.8A MOVING IMAGE A

FIG.8B MOVING IMAGE A
IM1 (PHOTOGRAPHING ORDER: 2)  IM2 (PHOTOGRAPHING ORDER: 3)  IM3 (PHOTOGRAPHING ORDER: 1)
(A1) (A2) (A3) (A4)

FIG.8C MOVING IMAGE B

FIG.8D MOVING IMAGE C

FIG.8E MOVING IMAGE D

FIG.8F MOVING IMAGE A1+C+A2+D+A3+B+A4
(A1) (C) (A2) (D) (A3) (B) (A4)

FIG.8G MOVING IMAGE A'

BAR1   M   BAR

IMAGE SENSING DEVICE, IMAGE EDIT METHOD, AND STORAGE MEDIUM FOR RECORDING IMAGE EDIT METHOD

This application is a U.S. National Phase Application Under 35 USC 371 of International Application PCT/JP03/15111 filed Nov. 26, 2003.

TECHNICAL FIELD

The present invention relates to an image sensing device that can record and play back a moving image, an image edit method, and a storage medium that records the image edit method.

BACKGROUND ART

In recent years, digital still cameras (to be simply referred to as "digital cameras" hereinafter) that can record image data obtained by photographing in semiconductor memories have prevailed beyond conventional cameras that record images on silver halide films.

Most models of digital cameras of this type can photograph not only still images but also time-series images, such as continuous-shot images, moving images, and the like although they cannot make long-time recording compared to camera-integrated video recorders in terms of the capacity of the recording media.

When a moving image is photographed by such a digital camera, individual moving image data recorded on a memory card or the like as a recording medium are independent from each other. Hence, it is difficult to make an operation for, e.g., combining two moving images into one moving image using the digital camera. In such case, edit software on a personal computer is required.

Under such circumstances, a digital camera which allows simple edit operations such as partial erase, divide, join, and the like of moving images by itself has been proposed. (For example, see patent reference 1.)

[Patent Reference 1]

Jpn. Pat. Appln. KOKAI Publication No. 11-275512

As described above, a digital camera of patent reference 1 allows the user to designate an edit point in a moving image, and to make edit operations for partially erasing, dividing, and joining a moving image with reference to the designated edit point.

Upon inserting another moving image B in the middle of given moving image A, which has already been recorded by this digital camera, the following operations are required:

(1) designating an edit point in moving image A;

(2) dividing moving image A into A1 and A2 by edit mode "scissors";

(3) joining moving images A1 and B by edit mode "glue"; and (4) joining moving images "A1+B" and A2 by edit mode "glue".

In addition, after the respective edit operations such as divide, join, and the like, the edited moving images are immediately saved by overwriting in a flash memory as a recording medium. Therefore, when the user confirms edited moving image "A1+B+A2" by selecting a play mode, and is not satisfied with the contents, he or she must re-do operations from those for dividing joined moving image "A1+B+A2" into three moving images by designating two edit points.

In this way, instructions for a plurality of moving images must be issued by combining basic edit operations. Therefore, troublesome operations are required as a whole, and re-doing also requires similar labor.

DISCLOSURE OF INVENTION

According to the present invention, an image sensing device is characterized by comprising a recording unit which records moving image data obtained by photographing, a designation unit which designates an arbitrary time position in the moving image data recorded in the recording unit, a photographing control unit which starts photographing of an image on the basis of designation of the time position by the designation unit, and an insert unit which inserts image data obtained by photographing by the photographing control unit in the moving image data on the basis of the designated time position, and stores the obtained moving image data.

BRIEF DESCRIPTION OF DRAWINGS

FIGS. 6A through 6G show examples of the edit contents of moving image data to be processed in the moving image insert mode according to the second embodiment;

FIGS. 8A through 8G show examples of the edit contents of moving image data to be processed in the moving image insert mode according to the third embodiment;

BEST MODE FOR CARRYING OUT THE INVENTION

First Embodiment

The first embodiment upon applying the present invention to a digital camera will be described hereinafter with reference to the accompanying drawings.

Figure 1A:
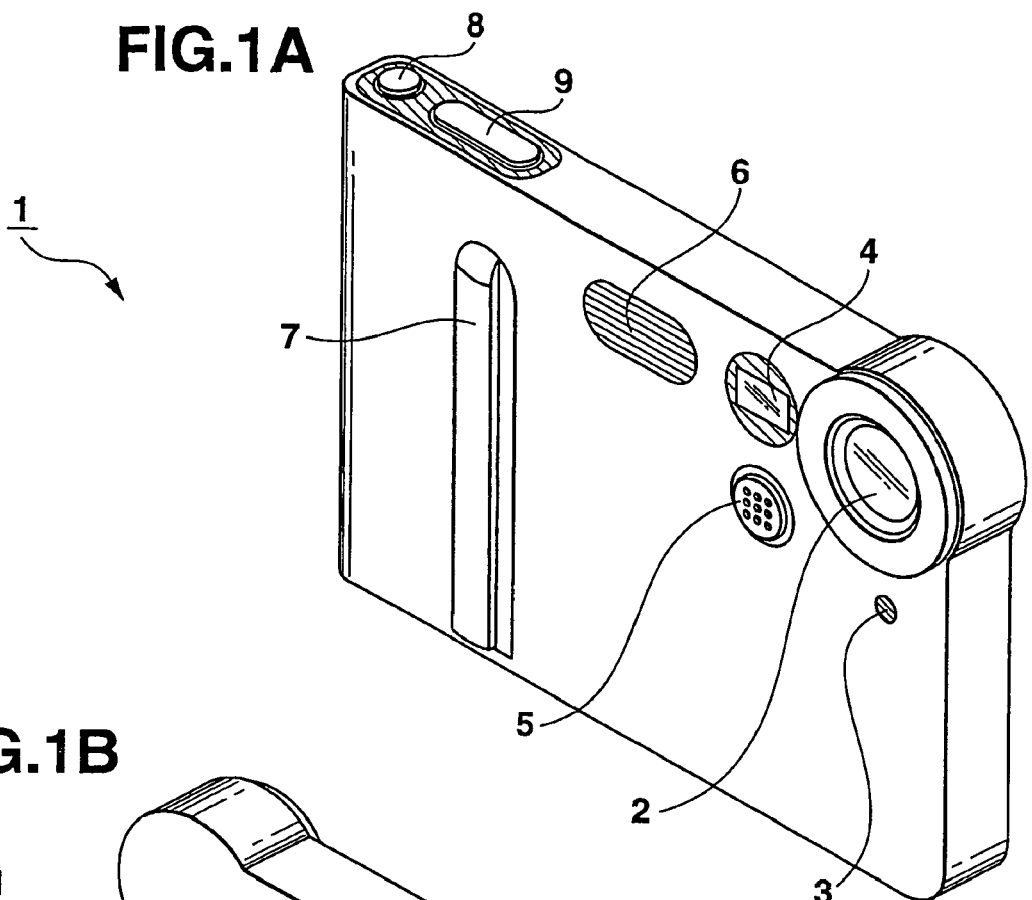
FIGS. 1A and 1B illustrate a perspective view showing the outer appearance of a digital camera according to the first embodiment of the present invention.
Figure 1B:
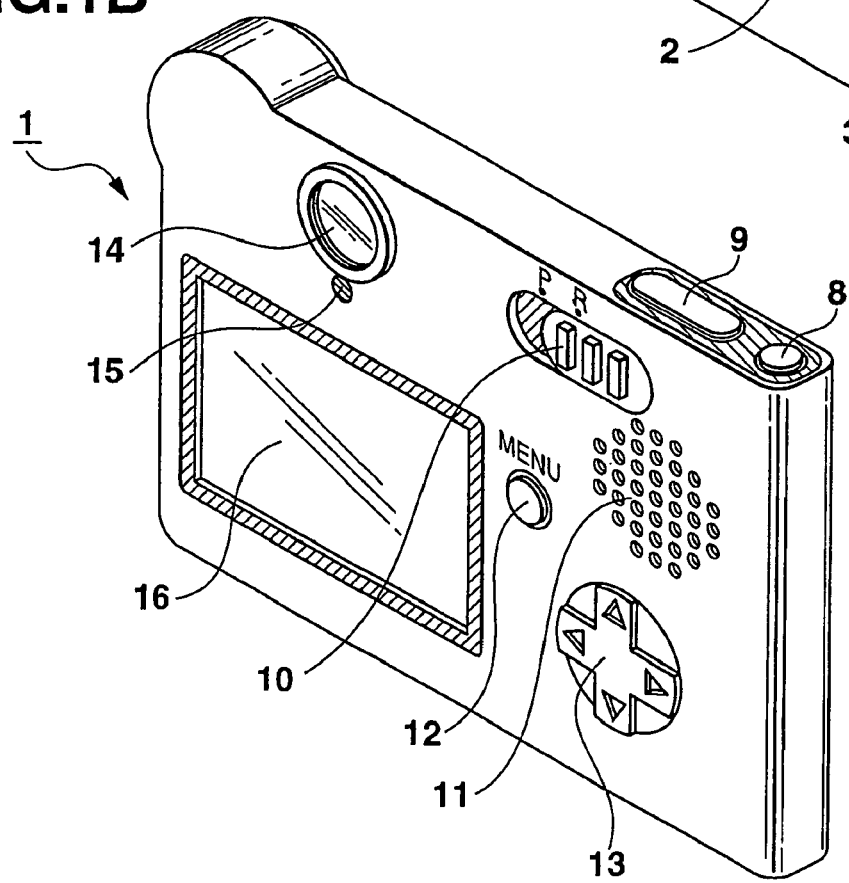

FIGS. 1A and 1B show the outer appearance of the digital camera. FIG. 1A is a perspective view mainly showing the front side of the digital camera, and FIG. 1B is a perspective view mainly showing the back side of it.

This digital camera 1 has a photographing lens 2, self timer lamp 3, optical viewfinder window 4, microphone 5, strobe emission unit 6, and rubber grip 7, which are arranged on the front surface of a substantially rectangular, low-profile body. On the right end side of the top surface (with respect to the user), a power key 8 and shutter key 9 are arranged.

The rubber grip 7 is a rubber, strip-shaped projection, which is arranged so that the second finger, third finger, and little finger of the right hand of the user can firmly hold a housing when he or she holds the digital camera 1 with the right hand from the right side surface side of the housing upon photographing.

The power key 8 is operated to turn on/off a power supply. The shutter key 9 is used to instruct photographing in a photographing mode. The shutter key 9 also serves as an execution key used to instruct setting/execution in, e.g., menu selection.

On the back surface of the digital camera 1, a mode switch (SW) 10, loudspeaker 11, menu key 12, cross key 13, optical viewfinder 14, strobe charge lamp 15, and display unit 16 are arranged.

The mode switch 10 comprises, e.g., a slide switch, and is used to switch between a record mode "R" and play mode "P" as basic modes.

The menu key 12 is operated upon selecting various menu items and the like.

The cross key 13 is formed by integrating cursor keys in the up, down, right, and left directions.

The display unit 16 comprises a color liquid crystal panel with a backlight. The display unit 16 displays a monitored through image as an electronic viewfinder in the record mode. Also, the display unit 16 displays a selected image played back in the play mode.

Assume that a memory card slot for detachably receiving a memory card used as a recording medium, a USB (Universal Serial Bus) connector as an example of a serial interface connector used to connect an external personal computer, and the like are provided on the bottom surface of the digital camera 1 (although none of them are shown).

The digital circuit arrangement of the digital camera 1 will be explained below using FIG. 2.

In a monitoring state in an image photographing mode, a focusing position and aperture position are moved by driving a motor (M) 21. A CCD 23 is an image sensing element which is arranged behind the photographing optical axis of a lens optical system 22 including the photographing lens 2. The CCD 23 is scanned and driven by a timing generator (TG) 24 and vertical driver 25, and outputs a photoelectric conversion output corresponding to a formed optical image for one frame at predetermined cycles.

This photoelectric conversion output appropriately undergoes gain adjustment for respective primary color components (RGB) as analog value signals, and is then sampled/held by a sample/hold circuit (S/H) 26. The output from the sample/hold circuit 26 is converted into digital data by an A/D converter 27. The digital data undergoes color processes including a pixel interpolation process and γ correction process by a color process circuit 28 to generate a luminance signal Y and color difference signals Cb and Cr of digital values. These signals are then output to a DMA (Direct Memory Access) controller 29.

The DMA controller 29 temporarily writes the luminance signal Y and color difference signals Cb and Cr output from the color process circuit 28 in its internal memory using a composite sync signal, memory write enable signal, and clock signal, which are also output from the color process circuit 28. The DMA controller 29 then DMA-transfers these signals to a DRAM 31 used as a buffer memory via a DRAM interface (I/F) 30.

A control unit 32 comprises a CPU 32A, a ROM 32B which permanently stores an operation program, a RAM 32C which is used as a work memory, a photographing control section 32D which starts photographing of an image, and an insert section 32E which inserts moving image data in another moving image data and stores them. The control unit 32 controls the operation of the overall digital camera 1. After the luminance and color difference signals are DMA-transferred to the DRAM 31, the control unit 32 reads out these luminance and color difference signals from the DRAM 31 via the DRAM interface 30, and writes them in a VRAM 34 via a VRAM controller 33.

A digital video encoder 35 periodically reads out the luminance and color difference signals from the VRAM 34 via the VRAM controller 33, generates a video signal based on these data, and outputs the video signal to the display unit 16.

The display unit 16 serves as a monitor display unit (electronic viewfinder) in the image photographing mode, as described above. The display unit 16 makes a display based on the video signal from the digital video encoder 35, thus displaying an image based on image information captured from the VRAM controller 33 at that time in real time.

When the user operates the shutter key 9 that forms a key input unit 36 (designation unit) at a timing at which he or she wants to photograph a still image, while an image at that time is displayed in this way on the display unit 16 as a monitor image in real time, a trigger signal is generated.

In response to this trigger signal, the control unit 32 closes a route from the CCD 23 to the DRAM 31 immediately after completion of DMA transfer of the luminance and color difference signals for one frame, which are captured from the CCD 23 at that time, to the DRAM 31, and shifts to a record/save state.

In the record/save state, the control unit 32 reads out the luminance and color difference signals for one frame, which are written in the DRAM 31, for respective units called basic blocks (8 pixels (vertical direction)×8 pixels (horizontal direction)) of each of Y, Cb, and Cr component data, and writes the readout signals in a JPEG (Joint Photographic Experts Group) circuit 37. The JPEG circuit 37 compresses data by processes such as ADCT (Adaptive Discrete Cosine Transform), Huffman encoding as entropy encoding, and the like.

The control unit 32 reads out the obtained encoded data from the JPEG circuit 37 as a data file of one image, and writes it in a flash memory 38 (recording unit) as a nonvolatile memory. The flash memory 38 is sealed in a memory card which is detachably attached as a recording medium of this digital camera 1.

Furthermore, this flash memory 38 may be incorporated in the digital camera 1 in addition to the detachable memory card, and both the memory card and internal memory may be used together.

Upon completion of the compression process of the luminance and color difference signals for one frame, and the write process of all compressed data in the flash memory 38, the control unit 32 opens the route from CCD 32 to the DRAM 31 again.

The control unit 32 is further connected with an audio processor 39 and USB interface (I/F) 40.

The audio processor 39 comprises a sound source circuit such as a PCM sound source or the like. In an audio recording mode, the audio processor 39 converts an audio signal input from the microphone (MIC) 5 into digital data. The audio processor 39 compresses that data according to a predetermined data file format, e.g., MP3 (MPEG-1 audio layer 3) to generate an audio data file, and sends that file to the control unit 32. On the other hand, in an audio play mode, the audio processor 39 decompresses the received audio data file and converts the decompressed data into an analog signal. The audio processor 39 then drives the loudspeaker (SP) 11 to produce a sound aloud.

The USB interface 40 makes communication control upon exchanging image data and the like with an external device (e.g., a personal computer) which is wired-connected via a USB connector 41.

Note that the key input unit 36 includes the power key 8, mode switch 10, menu key 12, cross key 13, and the like in addition to the shutter key 9. Signals generated upon operations of these keys are directly output to the control unit 32.

Upon photographing a moving image in place of a still image, still image data files which are obtained by compressing the still image data by the JPEG circuit 37 are temporally continuously recorded while the shutter key 9 of the key input unit 36 is kept operated. Upon completion of the operation of the shutter key 9 or after an elapse of a predetermined limit time (e.g., 30 seconds), a series of still image data files are re-set as a motion JPEG data file.

In a play mode, the control unit 32 selectively reads out image data recorded in the flash memory 38. The JPEG circuit 37 expands the compressed image data in a sequence opposite to the data compression sequence in the photographing mode. After the expanded image data is held in the DRAM 31 via the DRAM interface 30, the held contents of the DRAM 31 are stored in the VRAM 34 via the VRAM controller 33. The image data is then periodically read out from the VRAM 34 to generate a video signal, which is played back and output onto the display unit 16.

When the selected image data is not a still image but a moving image, individual still image data which form the selected moving image file are temporally continuously played back. Upon completion of playback of all still image data, only still image data located at the head of the moving image file is played back and displayed until the next play instruction is issued.

The operation of this embodiment will be explained below.

Figure 3:
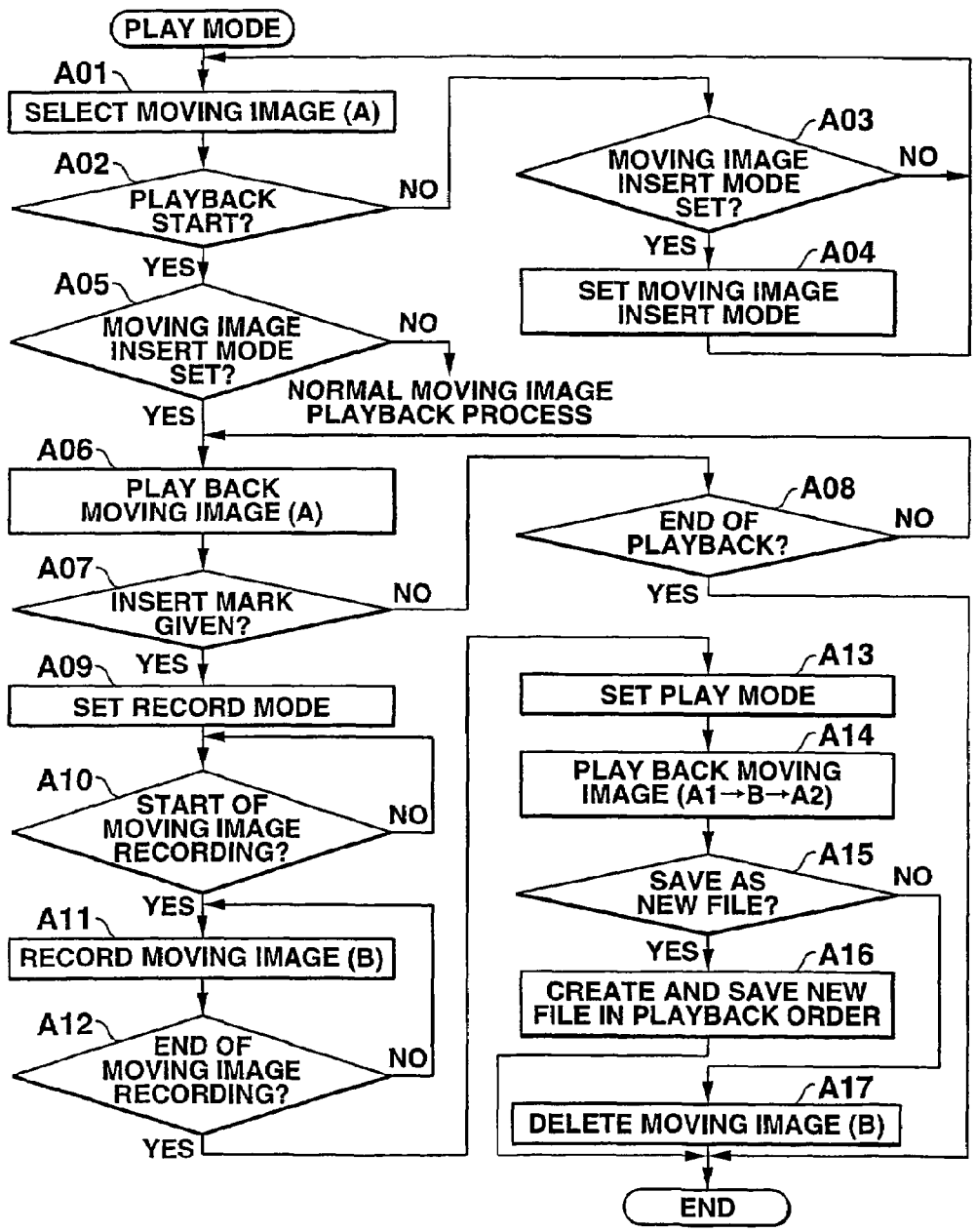
FIG. 3 is a flow chart showing the processing contents mainly in a moving image insert mode according to the first embodiment.

FIG. 3 shows a series of processing contents executed mainly by the control unit 32 until moving image data recorded in the flash memory 38 is selected, another moving image data is inserted in the selected moving image data, and the obtained data is recorded to update old data, while the play mode is selected by the mode switch 10.

At the beginning of this process, after moving image data to be displayed is selected (step A01), the control waits for one of the following key operations by repetitively checking whether or not the user has made a key operation that instructs play start by directly operating the shutter key 9 (step A02), or whether or not the user has designated a moving image insert mode for inserting another moving image in the middle of the selected moving image by operating the shutter key 9 after the operations of the menu key 12 and cross key 13 (step A03).

When the user has made the key operation associated with designation of the moving image insert mode, that operation is detected in step A03, and the moving image insert mode is set (step A04). The flow then returns to the process from step A01.

If it is determined in step A02 that the user has made the key operation for starting playback, it is determined whether or not the moving image insert mode is set at that time (step A05).

If the moving image insert mode is not set, it is determined that a normal moving image playback process is to be executed, and a description thereof will be omitted.

Figure 10:
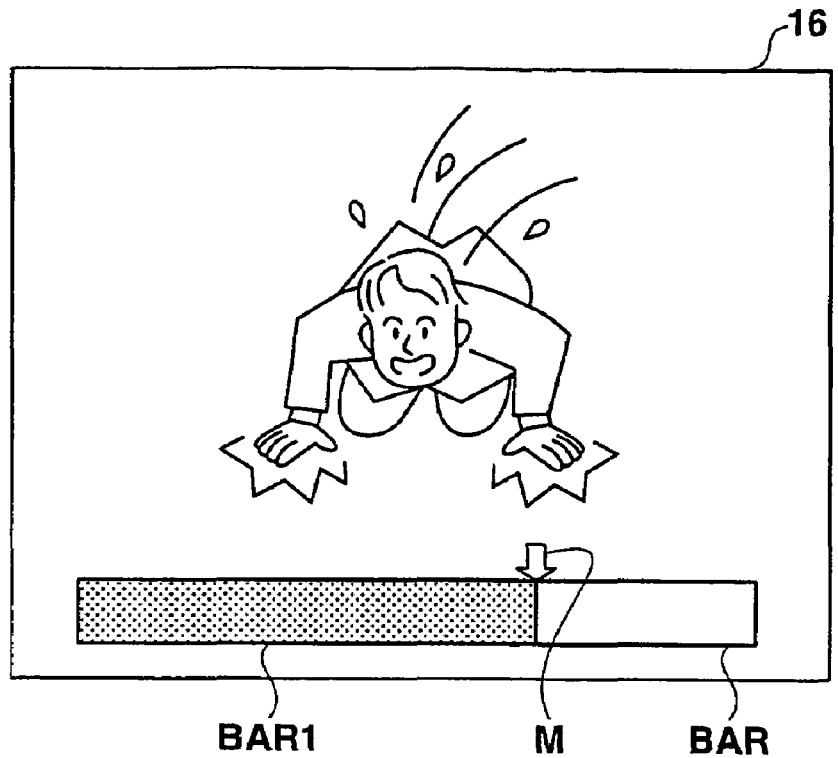
FIG. 10 shows a display example upon playing back moving image data in the moving image insert mode according to the first embodiment of the present invention.

If it is determined in step A05 that the moving image insert mode is set, the moving image data selected in step A01 begins to be played back (step A06). After that, the control waits for one of the following states by repetitively checking whether or not the user has given an insert mark that designates an insert timing in the middle of the moving image, whose playback and display are in progress, by operating, e.g., the shutter key 9 (step A07), and whether or not the playback process of the initially selected moving image is complete (step A08). FIG. 10 shows a display example on the display unit 16 in steps A06 and A07, i.e., a state wherein the user has given insert mark M that designates an insert timing during playback and display of the moving image data selected in step A01. A bar displayed below the moving image indicates the whole moving image data, whose playback and display are in progress, by BAR, and also the ratio of data played back so far of the whole data by BAR1.

If it is determined in step A08 that the playback process of the moving image is complete, it is determined that no insert mark is given, and the initially selected moving image consequently has no time position to be edited (inserted), thus ending a series of processes.

If it is determined in step A07 that the insert mark has been given, the control immediately transits from the play mode as the basic mode to the record mode (step A09), and waits for a key operation that instructs the start of recording a new moving image to be inserted (more specifically, the operation of the shutter key 9) (step A10).

In this case, the display unit 16 may also display a guide message as a character string:

"Press shutter to start photographing moving image to be inserted"

Figure 11:
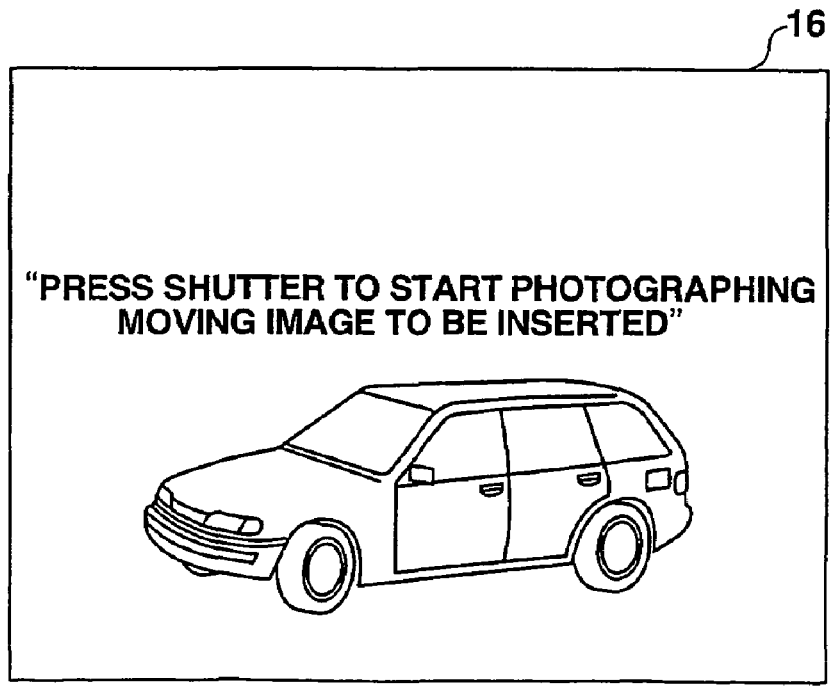
FIG. 11 shows a display example when a play mode in the moving image insert mode according to the first embodiment is switched to a record mode.

FIG. 11 shows a display example of the guide message superimposed on a through image displayed on the display unit 16 after the control has entered the record mode in step A09.

When the user has issued a recording start instruction of a moving image by operating the shutter key 9, that operation is detected in step A10. Then, the moving image to be inserted is recorded (step A11) while repeating a process for determining the end of recording of the moving image by checking whether the shutter key 9 is released or a predetermined limit time of moving image continuous recording (e.g., 30 seconds) has elapsed (step A12).

At this time, the obtained moving image data is sequentially recorded in the flash memory 38 as new moving image data.

If the end of recording of the moving image is determined in step A12, it is determined that the moving image data to be inserted has been acquired. Hence, the record mode is switched to the play mode again (step A13) to play back and display, on the display unit 16, moving image data obtained by inserting the new moving image data acquired by recording in the middle of the moving image data selected in step A01, from the beginning to the end (step A14).

Upon completion of the playback process, it is checked whether or not the played contents are recorded and saved as a new moving image data file (step A15).

This checking process is made by displaying, on the display unit 16, a guide message as a character string:

"Do you want to record contents played back now as new file?

YES NO"

and by determining whether the user directly operates the shutter key 9 while a character string part "YES" is highlighted by a cursor, or operates the shutter key 9 after he or she moves the highlight of the cursor to a character string part "NO" by operating the right key of the cross key 13.

If it is determined in step A15 that the obtained data is to be recorded and saved as a new file, the edit process is executed using the two moving image data recorded in the flash memory 38 to obtain the above playback order, and the edited moving image data is newly recorded as one moving image data (step A16), thus ending a series of processes.

On the other hand, if it is determined in step A15 that the obtained data is not to be recorded and saved as a new file, the moving image data to be inserted acquired by photographing is deleted by erasing it from the flash memory 38 (step A17), thus ending a series of processes.

Figure 4A:
FIGS. 4A through 4E show examples of the edit contents of moving image data to be processed in the moving image insert mode according to the first embodiment.

FIGS. 4A through 4E show examples of moving image data to be edited based on the series of processes mentioned above. Assume that moving image A shown in FIG. 4A is initially selected in step A01.

Figure 4B:
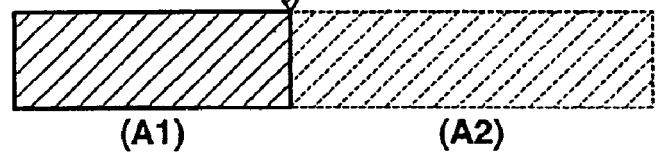

Also, assume that this moving image A is played back while setting the moving image insert mode, and insert mark IM is given at a playback timing shown in FIG. 4B. Let A1 be the former half of moving image A that has already been played back, and A2 be the latter half of moving image A to be played back.

Figure 4C:
Figure 4D:
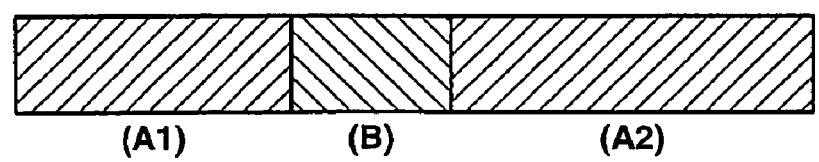

The record mode starts automatically, and moving image B to be inserted is newly recorded by the processes in steps A10 to A12, as shown in FIG. 4C. The play mode starts automatically in step A13, and the display unit 16 plays back and displays a series of moving images "A1+B+A2" obtained by inserting moving image B at the insert mark IM given position in moving image A, as shown in FIG. 4D, in step A14.

Figure 4E:

When the user has made the key operation that instructs to record and save, as a new moving image, played moving image A, in which moving image B is inserted at an arbitrary time position, new moving image A' is recorded in the flash memory 38 in step A16 to update old data, as shown in FIG. 4E. At the same time, the data files of old moving images A and B are erased from the flash memory 38 for the purpose of arrangement.

In this way, a series of edit processes required when an arbitrary time position is designated in an initially selected moving image (A), a new moving image (B) to be inserted is photographed, and a moving image (A1+B+A2) obtained by inserting the moving image (B) into the selected moving image (A) is played back and displayed can be executed by minimum required key operations without any change operations of the basic modes. Hence, the operations required for the user of the digital camera 1 to edit data can be greatly simplified.

In addition, after the user temporarily confirms the contents (A1+B+A2) obtained by inserting the moving image (B) to be inserted acquired by photographing, the obtained contents are recorded in the flash memory 38 as a recording medium. Therefore, when the user is not satisfied with the edited contents, the edited contents are not recorded, and the moving image (B) photographed aftertime is automatically deleted from the flash memory 38. Therefore, processes required until the user can re-do similar edit operations can be greatly reduced.

Second Embodiment

The second embodiment upon applying the present invention to a digital camera will be described hereinafter with reference to the accompanying drawings.

Figure 2:
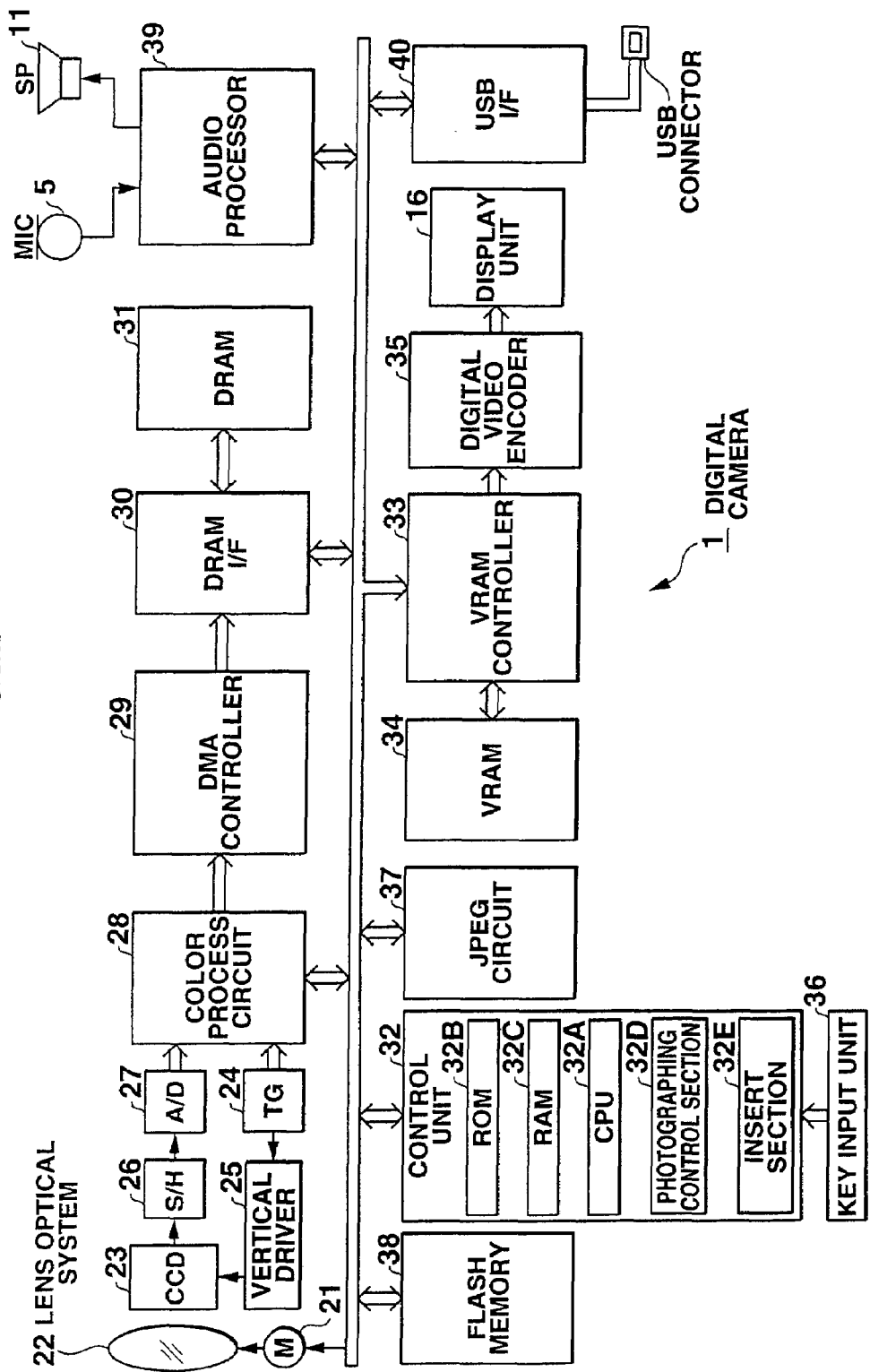
FIG. 2 is a block diagram showing the circuit arrangement according to the first embodiment.

Note that the outer appearance and digital circuit arrangement of the digital camera are basically the same as those shown in FIGS. 1A, 1B and 2. Hence, the same reference numerals in this embodiment denote the same parts as in the first embodiment, and an illustration and description thereof will be omitted.

The operation of this embodiment will be described below.

Figure 5:
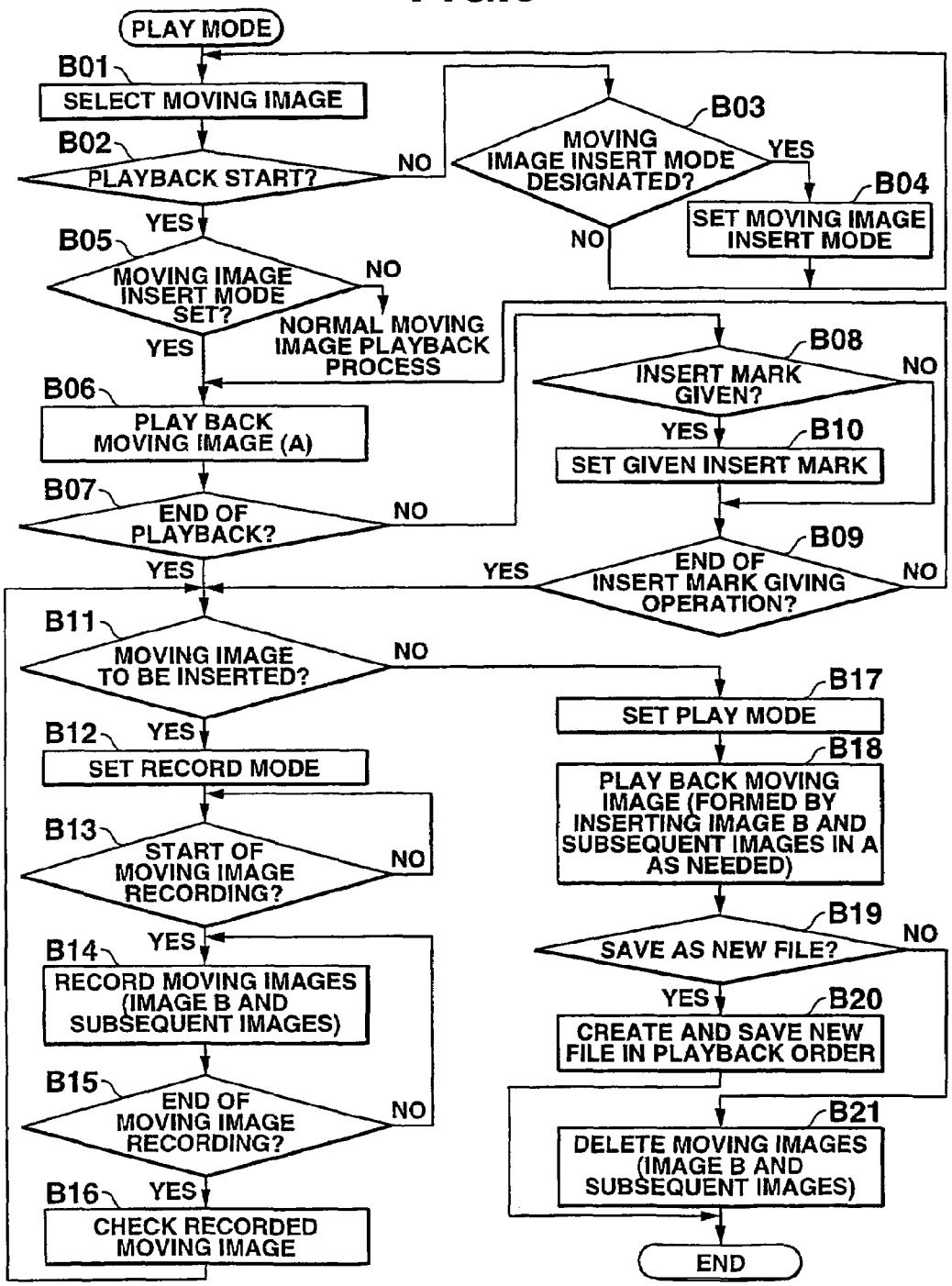
FIG. 5 is a flow chart showing the processing contents mainly in a moving image insert mode according to the second embodiment of the present invention.

FIG. 5 shows a series of processing contents executed mainly by the control unit 32 until moving image data recorded in the flash memory 38 is selected, another moving image data is inserted in the selected moving image data, and the obtained data is recorded to update old data, while the play mode is selected by the mode switch 10.

At the beginning of this process, after moving image data to be displayed is selected (step B01), the control waits for one of the following key operations by repetitively checking whether or not the user has made a key operation that instructs play start by directly operating the shutter key 9 (step B02), or whether or not the user has designated a moving image insert mode for inserting another moving image in the middle of the selected moving image by operating the shutter key 9 after the operations of the menu key 12 and cross key 13 (step B03).

When the user has made the key operation associated with designation of the moving image insert mode, that operation is detected in step B03, and the moving image insert mode is set (step B04). The flow then returns to the process from step B01.

If it is determined in step B02 that the user has made the key operation for starting playback, it is determined whether or not the moving image insert mode is set at that time (step B05).

If the moving image insert mode is not set, it is determined that a normal moving image playback process is to be executed, and a description thereof will be omitted.

If it is determined in step B05 that the moving image insert mode is set, the moving image data selected in step B01 begins to be played back (step B06). After that, the control waits for one of the following states by repetitively checking whether or not the playback process of the selected moving image is complete (step B07), whether or not the user has given an insert mark that designates an insert timing in the middle of the moving image, whose playback and display are in progress, by operating, e.g., the shutter key 9 (step B08), and whether or not the user ends the giving operation of the insert mark by operating, e.g., the right key of the cross key 13 (step B09).

If it is determined in step B08 that the user has given the insert mark, it is determined that the insert mark is to be given in correspondence with that time position, and the control unit 32 internally stores a setup of the given insert mark (step B10). The flow then returns to the process from step B09.

If it is determined in step B07 that the playback process of the selected moving image is complete or if it is determined in step B09 that the giving operation of the insert mark is to end, whether or not a moving image to be inserted in the selected moving image remains is determined by checking if the control unit 32 internally stores the setup of the given insert mark (step B11).

If it is determined that the moving image to be inserted remains, the control immediately transits from the play mode as the basic mode to the record mode (step B12), and waits for a key operation that instructs the start of recording a new moving image to be inserted (more specifically, the operation of the shutter key 9) (step B13).

In this case, the display unit 16 may also display a guide message as a character string:
"Press shutter to start photographing moving image to be inserted"

When the user has issued a recording start instruction of a moving image by operating the shutter key 9, that operation is detected in step B13. Then, the moving image to be inserted is recorded (step B14) while repeating a process for determining the end of recording of the moving image by checking whether the shutter key 9 is released or a predetermined limit time of moving image continuous recording (e.g., 30 seconds) has elapsed (step B15).

At this time, the obtained moving image data is sequentially recorded in the flash memory 38 as new moving image data.

If the end of recording of the moving image is determined in step B15, the setup of the given insert mark internally stored in the control unit 32 is checked by appending flag information indicating that the corresponding moving image has already been recorded (step B16). The flow then returns to step B11 to check if other moving images to be inserted still remain.

When a plurality of insert marks are given and set in step B10 and moving images are to be inserted at a plurality of positions in the initially selected moving image, the processes in steps B11 to B16 are repeated in correspondence with the number of insert marks, and moving images to be inserted are recorded in turn.

Upon completion of photographing and recording of all moving images to be recorded, it is determined in step B11 that no moving image to be inserted remains, and the record mode is switched to the play mode again (step B17). Then, the display unit 16 plays back and displays moving image data in which a plurality of new moving image data acquired by recording are inserted in the middle of the moving image data selected in step B01 from the beginning to the end (step B18).

Upon completion of the playback process, it is checked whether or not the played contents are recorded and saved as a new moving image data file (step B19).

This checking process is made by displaying, on the display unit 16, a guide message as a character string:

"Do you want to record contents played back now as new file?
YES NO"

and by determining whether the user directly operates the shutter key 9 while a character string part "YES" is highlighted by a cursor, or operates the shutter key 9 after he or she moves the highlight of the cursor to a character string part "NO" by operating the right key of the cross key 13.

If it is determined in step B19 that the obtained data is to be recorded and saved as a new file, the edit process is executed using the respective moving image data recorded in the flash memory 38 to obtain the above playback order, and the edited moving image data is newly recorded as one moving image data (step B20), thus ending a series of processes.

On the other hand, if it is determined in step B19 that the obtained data is not to be recorded and saved as a new file, respective moving image data to be inserted acquired by photographing are deleted by simultaneously erasing them from the flash memory 38 (step B21), thus ending a series of processes.

FIGS. 6A through 6G show examples of moving image data to be edited based on the series of processes mentioned above. Assume that moving image A shown in FIG. 6A is initially selected in step B01.

Also, assume that this moving image A is played back while setting the moving image insert mode, and insert marks IM1 to IM3 are given at respective playback timings shown in FIG. 6B. Then, this moving image A is divided into partial images A1 to A4 at the positions of insert marks IM1 to IM3 given in this way.

The record mode starts automatically, and moving images B to D to be inserted are newly recorded in turn by the processes in steps B13 to B16, as shown in FIGS. 6C to 6E. Then, after it is determined in step B11 that the recording processes of required moving images to be inserted are complete, the play mode starts automatically in step B17.

In step B18, the display unit 16 plays back and displays a series of roving images "A1+B+A2+C+A3+D+A4" obtained by inserting moving images B, C, and D at the given positions of insert marks IM1 to IM3 in moving image A, as shown in FIG. 6F.

When the user has made the key operation that instructs to record and save, as a new moving image, played moving image A, in which moving images B to D are inserted at arbitrary time positions, new moving image A' is recorded in the flash memory 38 in step B20 to update old data, as shown in FIG. 6G. At the same time, the data files of old moving image A and moving images B to D to be inserted acquired by photographing are erased from the flash memory 38 for the purpose of arrangement.

In this way, a series of edit processes required when a plurality of arbitrary time positions are designated in an initially selected moving image (A), new moving images (B to D) to be inserted are photographed in turn, and a moving image (A1+B+A2+C+A3+D+A4) obtained by inserting these moving images into the selected moving image (A) is played back and displayed can be executed by minimum required key operations without any change operations of the basic modes. Hence, the operations required for the user of the digital camera 1 to edit data can be greatly simplified.

In addition, since a plurality of moving images are inserted in the initially selected moving image, for example, a flashback-like video effect can be easily set and executed, thus widening the range of expression.

Third Embodiment

The third embodiment upon applying the present invention to a digital camera will be described hereinafter with reference to the accompanying drawings.

Note that the outer appearance and digital circuit arrangement of the digital camera are basically the same as those shown in FIGS. 1A, 1B and 2. Hence, the same reference numerals in this embodiment denote the same parts as in the first embodiment, and an illustration and description thereof will be omitted.

The operation of this embodiment will be described below.

Figure 7:
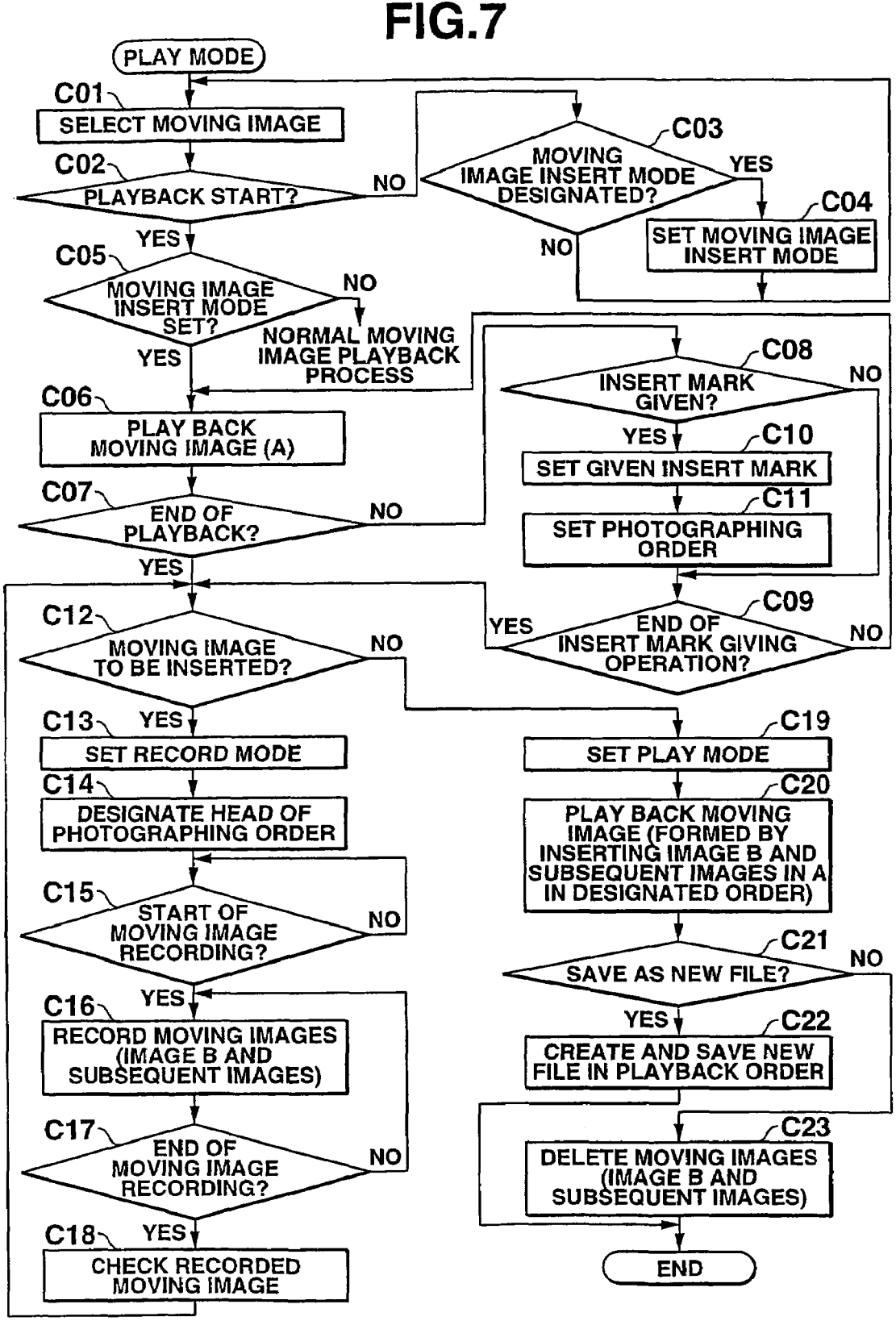
FIG. 7 is a flow chart showing the processing contents mainly in a moving image insert mode according to the third embodiment of the present invention.

FIG. 7 shows a series of processing contents executed mainly by the control unit 32 until moving image data recorded in the flash memory 38 is selected, another moving image data is inserted in the selected moving image data, and the obtained data is recorded to update old data, while the play mode is selected by the mode switch 10.

At the beginning of this process, after moving image data to be displayed is selected (step C01), the control waits for one of the following key operations by repetitively checking whether or not the user has made a key operation that instructs play start by directly operating the shutter key 9 (step C02), or whether or not the user has designated a moving image insert mode for inserting another moving image in the middle of the selected moving image by operating the shutter key 9 after the operations of the menu key 12 and cross key 13 (step C03).

When the user has made the key operation associated with designation of the moving image insert mode, that operation is detected in step C03, and the moving image insert mode is set (step C04). The flow then returns to the process from step C01.

If it is determined in step C02 that the user has made the key operation for starting playback, it is determined whether or not the moving image insert mode is set at that time (step C05).

If the moving image insert mode is not set, it is determined that a normal moving image playback process is to be executed, and a description thereof will be omitted.

If it is determined in step C05 that the moving image insert mode is set, the moving image data selected in step C01 begins to be played back (step C06). After that, the control waits for one of the following states by repetitively checking whether or not the playback process of the selected moving image is complete (step C07), whether or not the user has given an insert mark that designates an insert timing in the middle of the moving image, whose playback and display are in progress, by operating, e.g., the shutter key 9 (step C08), and whether or not the user ends the giving operation of the insert mark by operating, e.g., the right key of the cross key 13 (step C09).

If it is determined in step C08 that the user has given the insert mark, it is determined that the insert mark is to be given in correspondence with that time position, and the control unit 32 internally stores a setup of the given insert mark (step C10). At the same time, the control unit 32 stores a setup of the photographing order of that insert mark (step C11). The flow then returns to the process from step C09.

If it is determined in step C07 that the playback process of the selected moving image is complete or if it is determined in step C09 that the giving operation of the insert mark is to end, whether or not a moving image to be inserted in the selected moving image remains is determined by seeing if the control unit 32 internally stores the setup of the given insert mark (step C12).

If it is determined that the moving image to be inserted remains, the control immediately transits from the play mode as the basic mode to the record mode (step C13). After the first position of those of moving images to be inserted in the photographing order is designated (step C14), the control waits for a key operation that instructs the start of recording a new moving image to be inserted (more specifically, the operation of the shutter key 9) (step C15).

In this case, the display unit 16 may also display a guide message as a character string:
   "Press shutter to start photographing moving image to be inserted"

When the user has issued a recording start instruction of a moving image by operating the shutter key 9, that operation is detected in step C15. Then, the moving image to be inserted is recorded (step C16) while repeating a process for determining the end of recording of the moving image by checking whether the shutter key 9 is released or a predetermined limit time of moving image continuous recording (e.g., 30 seconds) has elapsed (step C17).

At this time, the obtained moving image data is sequentially recorded in the flash memory 38 as new moving image data.

If the end of recording of the moving image is determined in step C17, the setup of the given insert mark internally stored in the control unit 32 is checked by appending flag information indicating that the corresponding moving image has already been recorded (step C18). The flow then returns to step C12 to check if other moving images to be inserted still remain.

When a plurality of insert marks are given and set in steps C10 and C11 and moving images are to be inserted at a plurality of positions in the initially selected moving image, the processes in steps C12 to B18 are repeated in correspondence with the number of insert marks, and moving images to be inserted are recorded in turn in accordance with the designated photographing order.

Upon completion of photographing and recording of all moving images to be recorded, it is determined in step C12 that no moving image to be inserted remains, and the record mode is switched to the play mode again (step C19). Then, the display unit 16 plays back and displays moving image data in which a plurality of new moving image data acquired by recording in the designated photographing order are inserted in the middle of the moving image data selected in step C01 from the beginning to the end (step C20).

Upon completion of the playback process, it is checked whether or not the played contents are recorded and saved as a new moving image data file (step C21).

This checking process is made by displaying, on the display unit 16, a guide message as a character string:
   "Do you want to record contents played back now as new file?
   YES NO"

and by determining whether the user directly operates the shutter key 9 while a character string part "YES" is highlighted by a cursor, or operates the shutter key 9 after he or she moves the highlight of the cursor to a character string part "NO" by operating the right key of the cross key 13.

If it is determined in step C21 that the obtained data is to be recorded and saved as a new file, the edit process is executed using the respective moving image data recorded in the flash memory 38 to obtain the above playback order, and the edited moving image data is newly recorded as one moving image data (step C22), thus ending a series of processes.

On the other hand, if it is determined in step C21 that the obtained data is not to be recorded and saved as a new file, respective moving image data to be inserted acquired by photographing are deleted by simultaneously erasing them from the flash memory 38 (step C23), thus ending a series of processes.

FIGS. 8A through 8G show examples of moving image data to be edited based on the series of processes mentioned above. Assume that moving image A shown in FIG. 8A is initially selected in step C01.

Also, assume that this moving image A is played back while setting the moving image insert mode, and insert marks IM1 to IM3 are given at a total of three positions at playback timings shown in FIG. 8B. In this case, the photographing order of moving images to be inserted is designated at the same time. Then, this moving image A is divided into partial images A1 to A4 at the positions of insert marks IM1 to IM3 designated in this way.

The record mode starts automatically, and moving images B to D to be inserted are newly recorded in turn by the processes in steps C15 to C18, as shown in FIGS. 8C to 8E. Then, after it is determined in step C12 that the recording processes of required moving images to be inserted are complete, the play mode starts automatically in step C19.

In step C20, the display unit 16 plays back and displays a series of moving images "A1+C+A2+D+A3+B+A4" obtained by inserting moving images B, C, and D at the given positions of insert marks IM1 to IM3 in moving image A in accordance with the designated photographing order, as shown in FIG. 8F.

When the user has made the key operation that instructs to record and save, as a new moving image, played moving image A, in which moving images B to D are inserted at arbitrary time positions in accordance with the designated photographing order, new moving image A' is recorded in the flash memory 38 in step C22 to update old data, as shown in FIG. 8G. At the same time, the data files of old moving image A and moving images B to D to be inserted acquired by photographing are erased from the flash memory 38 for the purpose of arrangement.

In this way, a series of edit processes required when a plurality of arbitrary time positions are designated in an initially selected moving image (A), new moving images (B to D) to be inserted are photographed in turn in accordance with the designated order, and a moving image (A1+C+A2+D+ A3+B+A4) obtained by inserting these moving images into the selected moving image (A) is played back and displayed can be executed by minimum required key operations without any change operations of the basic modes. Hence, the operations required for the user of the digital camera 1 to edit data can be greatly simplified.

In addition, since a plurality of moving images are inserted in the initially selected moving image, for example, a flashback-like video effect can be easily set and executed, thus extending the range of expression.

Furthermore, since the photographing order of each individual moving image to be inserted in the middle of a given moving image can be designated, the labor required to photograph and edit images can be reduced, according to user's ingenuity, thus easily creating a richly expressive moving image.

Fourth Embodiment

The fourth embodiment upon applying the present invention to a digital camera will be described hereinafter with reference to the accompanying drawings.

Note that the outer appearance and digital circuit arrangement of the digital camera are basically the same as those shown in FIGS. 1A, 1B and 2. Hence, the same reference numerals in this embodiment denote the same parts as in the first embodiment, and an illustration and description thereof will be omitted.

The operation of this embodiment will be described below.

Figure 9:
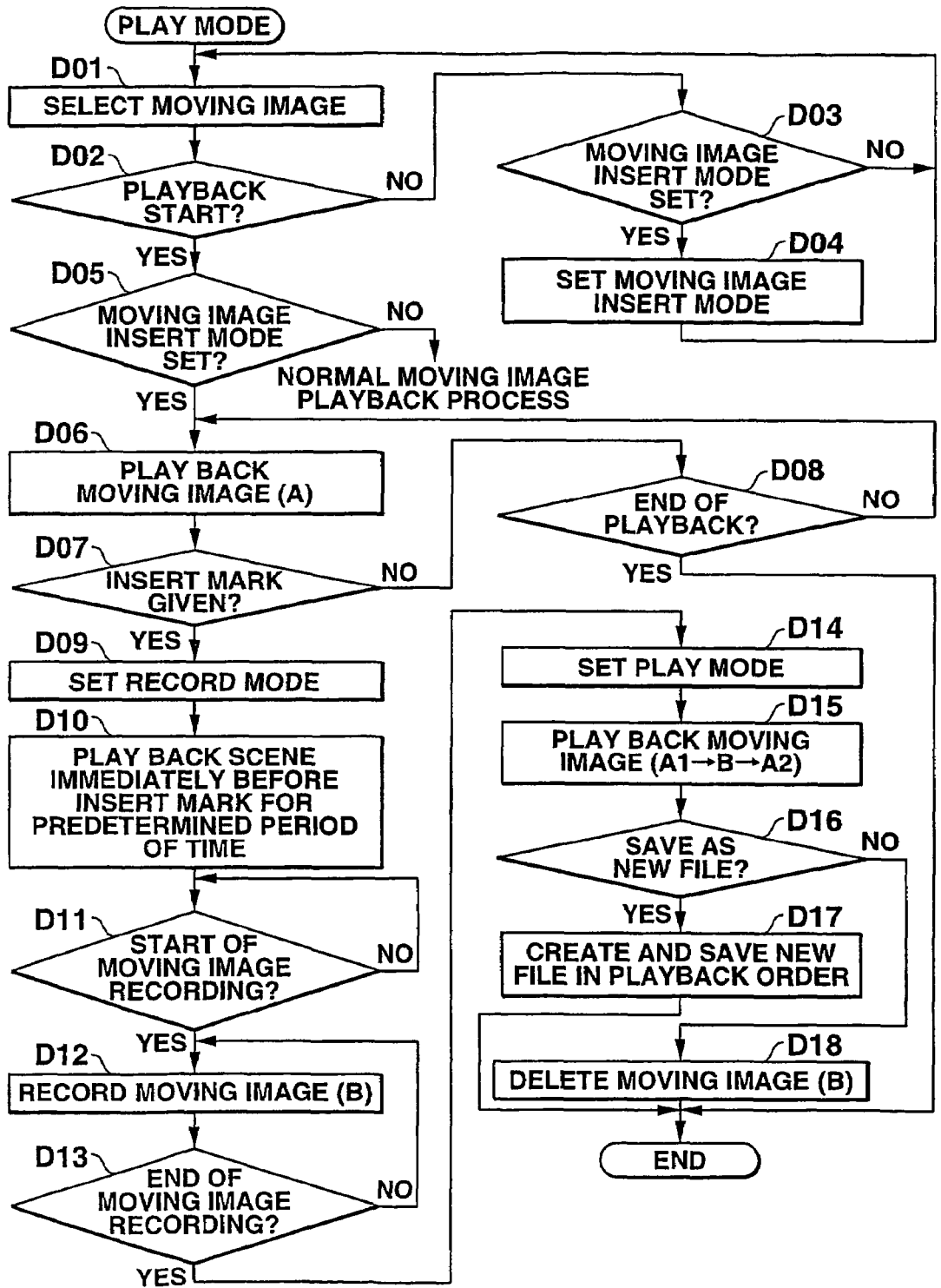
FIG. 9 is a flow chart showing the processing contents mainly in a moving image insert mode according to the fourth embodiment of the present invention.

FIG. 9 shows a series of processing contents executed mainly by the control unit 32 until moving image data recorded in the flash memory 38 is selected, another moving image data is inserted in the selected moving image data, and the obtained data is recorded to update old data, while the play mode is selected by the mode switch 10.

At the beginning of this process, after moving image data to be displayed is selected (step D01), the control waits for one of the following key operations by repetitively checking whether or not the user has made a key operation that instructs play start by directly operating the shutter key 9 (step D02), or whether or not the user has designated a moving image insert mode for inserting another moving image in the middle of the selected moving image by operating the shutter key 9 after the operations of the menu key 12 and cross key 13 (step D03).

When the user has made the key operation associated with designation of the moving image insert mode, that operation is detected in step D03, and the moving image insert mode is set (step D04). The flow then returns to the process from step D01.

If it is determined in step D02 that the user has made the key operation for starting playback, it is determined whether or not the moving image insert mode is set at that time (step D05).

If the moving image insert mode is not set, it is determined that a normal moving image playback process is to be executed, and a description thereof will be omitted.

If it is determined in step D05 that the moving image insert mode is set, the moving image data selected in step D01 begins to be played back (step D06). After that, the control waits for one of the following states by repetitively checking whether or not the user has given an insert mark that designates an insert timing in the middle of the moving image, whose playback and display are in progress, by operating, e.g., the shutter key 9 (step D07), and whether or not the playback process of the initially selected moving image is complete (step D08).

If it is determined in step D08 that the playback process of the moving image is complete, it is determined that no insert mark is given, and the initially selected moving image consequently has no time position to be edited (inserted), thus ending a series of processes.

If it is determined in step D07 that the insert mark has been given, the control immediately transits from the play mode as the basic mode to the record mode (step D09). In addition, the display unit 16 plays back a moving image for a predetermined period of time (e.g., 5 seconds) by tracing from the time position in the moving image at which the insert mark is given and set (step D10). The control then waits for a key operation that instructs the start of recording a new moving image to be inserted (more specifically, the operation of the shutter key 9) (step D11).

In this case, the display unit 16 may also display a guide message as a character string:

"Press shutter to start photographing moving image to be inserted"

When the user has issued a recording start instruction of a moving image by operating the shutter key 9, that operation is detected in step D11. Then, the moving image to be inserted is recorded (step D12) while repeating a process for determining the end of recording of the moving image by checking whether the shutter key 9 is released or a predetermined limit time of moving image continuous recording (e.g., 30 seconds) has elapsed (step D13).

At this time, the obtained moving image data is sequentially recorded in the flash memory 38 as new moving image data.

If the end of recording of the moving image is determined in step D13, it is determined that the moving image data to be inserted has been acquired. Hence, the record mode is switched to the play mode again (step D14) to play back and display, on the display unit 16, moving image data obtained by inserting the new moving image data acquired by recording in the middle of the moving image data selected in step D01, from the beginning to the end (step D15).

Upon completion of the playback process, it is checked whether or not the played contents are recorded and saved as a new moving image data file (step D16).

This checking process is made by displaying, on the display unit 16, a guide message as a character string:

"Do you want to record contents played back now as new file?

YES NO"

and by determining whether the user directly operates the shutter key 9 while a character string part "YES" is highlighted by a cursor, or operates the shutter key 9 after he or she moves the highlight of the cursor to a character string part "NO" by operating the right key of the cross key 13.

If it is determined in step D16 that the obtained data is to be recorded and saved as a new file, the edit process is executed using the two moving image data recorded in the flash memory 38 to obtain the above playback order, and the edited moving image data is newly recorded as one moving image data (step D17), thus ending a series of processes.

On the other hand, if it is determined in step D16 that the obtained data is not to be recorded and saved as a new file, the moving image data to be inserted acquired by photographing is deleted by erasing it from the flash memory 38 (step D18), thus ending a series of processes.

FIGS. 4A through 4E above show an example of moving image data to be edited based on the series of processes mentioned above. Assume that moving image A shown in FIG. 4A is initially selected in step D01.

Also, assume that this moving image A is played back while setting the moving image insert mode, and insert mark IM is given at a playback timing shown in FIG. 4B. Let A1 be the former half of moving image A that has already been played back, and A2 be the latter half of moving image A to be played back.

The record mode starts automatically, and an image for a predetermined period of time from the timing at which insert mark IM is given is played back and displayed again in step D10 to make the user recognize well the image of a moving image to be inserted. After that, moving image B to be inserted is newly recorded by the processes in steps D11 to A13, as shown in FIG. 4C. The play mode starts automatically in step D14, and the display unit 16 plays back and displays a series of moving images "A1+B+A2" obtained by inserting moving image B at the insert mark IM given position in moving image A, as shown in FIG. 4D, in step D15.

When the user has made the key operation that instructs to record and save, as a new moving image, played moving image A, in which moving image B is inserted at an arbitrary time position, new moving image A' is recorded in the flash memory 38 in step D17 to update old data, as shown in FIG. 4E. At the same time, the data files of old moving images A and B are erased from the flash memory 38 for the purpose of arrangement.

In this way, a series of edit processes required when an arbitrary time position is designated in an initially selected moving image (A), a new moving image (B) to be inserted is photographed, and a moving image (A1+B+A2) obtained by inserting the moving image (B) into the selected moving image (A) is played back and displayed can be executed by minimum required key operations without any change operations of the basic modes. Hence, the operations required for the user of the digital camera 1 to edit data can be greatly simplified.

In addition, after the user firmly visually recognizes a scene immediately after a new moving image to be inserted, the photographing operation of that image starts. Therefore, the user can start photographing the moving image to be inserted after he or she sufficiently recognizes his or her intention, thus reducing photographing failures.

Note that the fourth embodiment has explained the playback process of a moving image for a predetermined period of time in step D10 in combination with the operation of the first embodiment. However, this process can be executed in combination with the operation of the second or third embodiment in addition to the first embodiment.

In this case, prior to the beginning of photographing of a new moving image to be photographed and recorded, a scene immediately before that moving image is inserted is played back in consideration of the photographing order, and the user can visually confirm the contents.

Furthermore, in the first to fourth embodiments, when moving image A' is recorded in the flash memory 38 as the recording medium, the data files of old moving images A and B are erased from the flash memory 38 at the same time. Alternatively, the old data files may not be erased, or the user may select whether or not old moving images A and B are to be erased. When old moving images A and B are kept intact, the use range of image data of the user can be broadened.

In the first to fourth embodiments, image data to be inserted in a moving image is a moving image. However, image data to be inserted is not limited to a moving image but may be a still image. In this case, a still image is converted into that for a predetermined period of time (e.g., 2 seconds) in the same data format as moving image A, and the converted still image is inserted in the same manner as in the case wherein moving image B is inserted. Then, the obtained data is recorded in the flash memory 38 in the same manner as moving image A'. Assume that the user can arbitrarily set the predetermined period of time. Of course, the user can select whether or not the old moving image and still image are to be erased. In this way, image edit operations intended by the user can be made.

In the first to fourth embodiments, the present invention is applied to the digital camera. However, the present invention is not limited to this, and may be applied to various other image sensing devices such as camera-integrated video tape recorders which use a randomly accessible semiconductor memory, hard disk device, and the like as recording media, and a portable phone terminal and PDA (Personal Digital Assistants) which are compatible to moving images, and the like.

The present invention is not limited to the aforementioned embodiments, and various modifications may be made without departing from the scope of the invention when it is practiced.

Furthermore, the embodiments include inventions at various stages, and various inventions can be extracted by appropriately combining a plurality of disclosed required constituent elements. For example, even when some required constituent elements are omitted from all required constituent elements described in the embodiment, an arrangement from which the required constituent elements are omitted can be extracted as an invention as long as the problems that have been discussed in the paragraphs of the problems to be solved by the invention are solved, and the effects that have been explained in the paragraphs of the effect of the invention can be obtained.

The invention is:

1. An image sensing device, which communicates with a recording unit that records photographed moving image data, the image sensing device comprising:

a designation unit which designates at least one arbitrary time position in the moving image data recorded in the recording unit;

a display control unit which displays said at least one arbitrary time position designated by the designation unit in correspondence with a bar of the moving image data;

a photographing control unit which effects shifting into a new photographing mode when the designation unit has designated said at least one arbitrary time position; and an insert unit which inserts at least one newly photographed image data at said at least one designated arbitrary time position in the moving image data, wherein said at least one newly photographed image data is obtained by at least one photographing operation in said new photographing mode set by the photographing control unit, as at least one image data corresponding to said at least one designated arbitrary time position.

2. An image sensing device according to claim 1, wherein the designation unit designates a plurality of arbitrary time positions and a photographing order in the moving image data, and the insert unit inserts each of a plurality of newly photographed image data in the respective designated time positions of the moving image data in accordance with the photographing order designated by the designation unit.

3. An image sensing device according to claim 1, wherein image data obtained in the new photographing mode set by the photographing control unit is one of moving image data and still image data.

4. An image sensing device according to claim 1, further comprising a playback control unit which plays back and controls the moving image data recorded in the recording unit, and wherein the designation unit designates said at least one arbitrary time position with respect to the moving image data played back and controlled by the playback control unit.

5. An image sensing device according to claim 4, further comprising a control unit which stops playback control of the moving image data when each of said at least one designated arbitrary time position is reached.

6. An image sensing device according to claim 1, wherein the insert unit inserts newly photographed moving image data.

7. An image sensing device according to claim 1, wherein the insert unit inserts newly photographed still image data.

8. An image edit method comprising:

designating at least one arbitrary time position in moving image data recorded in a recording medium that records photographed moving image data;

displaying said at least one designated arbitrary time position in correspondence with a bar of the moving image data;

effecting shifting into a new photographing mode when said at least one arbitrary time position has been designated; and inserting at least one newly photographed image data at said at least one designated arbitrary time position in the moving image data, wherein said at least one newly photographed image data is obtained by at least one photographing operation in said new photographing mode, as at least one image data corresponding to said at least one designated arbitrary time position.

9. An image edit method according to claim 8, wherein the designating comprises designating a plurality of arbitrary time positions and a photographing order in the moving image data, and the inserting comprises inserting each of a plurality of newly photographed image data in the respective designated time positions of the moving image data in accordance with the designated photographing order.

10. A computer readable medium encoded with a computer image edit program for controlling an image sensing unit to execute:

designating at least one arbitrary time position in moving image data which is recorded on a recording medium that records photographed moving image data;

displaying said at least one designated arbitrary time position in correspondence with a bar of the moving image data;

effecting shifting into a new photographing mode when said at least one arbitrary time position has been designated; and inserting at least one newly photographed image data at said at least one designated arbitrary time position in the moving image data, wherein said at least one newly photographed image data is obtained by at least one photographing operation in said new photographing mode, as at least one image data corresponding to said at least one designated arbitrary time position.

11. A computer readable medium according to claim 10, wherein the designating comprises designating a plurality of arbitrary time positions and a photographing order in the moving image data, and the inserting comprises inserting each of a plurality of newly photographed image data in the respective designated time positions of the moving image data in accordance with the designated photographing order.

* * * * *